United States Patent
Kubba et al.

(10) Patent No.: US 11,075,773 B1
(45) Date of Patent: Jul. 27, 2021

(54) DATA CAP MANAGEMENT OF SUPER HEAVY USERS BASED ON MONTHLY USAGE AND SERVICE PLAN LIMITS

(71) Applicant: HUGHES NETWORK SYSTEMS, LLC, Germantown, MD (US)

(72) Inventors: Rajeev Kubba, Germantown, MD (US); Ying Wang, Germantown, MD (US); Shivaram Sitaram, Germantown, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 16/735,173

(22) Filed: Jan. 6, 2020

(51) Int. Cl.
| | |
|---|---|
| H04W 24/08 | (2009.01) |
| H04L 12/24 | (2006.01) |
| H04L 29/06 | (2006.01) |
| H04L 12/14 | (2006.01) |
| H04B 7/15 | (2006.01) |
| H04L 29/08 | (2006.01) |
| H04L 12/813 | (2013.01) |

(52) U.S. Cl.
CPC .......... H04L 12/1403 (2013.01); H04B 7/15 (2013.01); H04L 41/145 (2013.01); H04L 47/20 (2013.01); H04L 67/22 (2013.01); H04L 67/36 (2013.01)

(58) Field of Classification Search
CPC ... G06N 20/00; H04L 41/0816; H04L 41/145; H04L 41/147; H04L 41/22; H04L 43/045; H04L 43/06; H04L 43/062; H04L 43/16; H04L 47/127

USPC .......... 455/12.1, 427; 370/316, 256; 705/30, 705/51; 709/203
See application file for complete search history.

(56) References Cited

U.S. PATENT DOCUMENTS

| | | | | |
|---|---|---|---|---|
| 6,064,881 | A * | 5/2000 | Shea | H04M 15/00 455/12.1 |
| 6,493,538 | B1 * | 12/2002 | Jabbarnezhad | H04B 7/18584 455/12.1 |
| 6,574,610 | B1 * | 6/2003 | Clayton | G06Q 30/0284 705/51 |
| 9,748,989 | B1 * | 8/2017 | Freedman | H04B 7/2041 |
| 9,900,082 | B1 * | 2/2018 | Chowdhury | H04L 43/0876 |
| 2003/0222820 | A1 * | 12/2003 | Karr | G01S 1/026 342/457 |
| 2005/0052992 | A1 * | 3/2005 | Cloonan | H04L 47/10 370/229 |
| 2005/0190739 | A1 * | 9/2005 | Sparrell | H04B 7/2659 370/347 |
| 2008/0027688 | A1 * | 1/2008 | Jiang | H04L 41/0681 703/2 |
| 2012/0084349 | A1 * | 4/2012 | Lee | G06Q 30/0251 709/203 |

(Continued)

*Primary Examiner* — Tan H Trinh
(74) *Attorney, Agent, or Firm* — Jones Robb, PLLC

(57) ABSTRACT

An apparatus and method for data cap management of users exceeding or violating bandwidth policies in a communication system. A model is created for identifying super heavy users, and trained usage data for all current users of the communication system for a predetermined time interval. Usage patterns of each user are analyzed over a second duration using the trained model in order to identify current super heavy users based, at least in part, on the analysis. Traffic flow control restrictions are then applied to some or all of the traffic associated with identified super heavy users.

20 Claims, 9 Drawing Sheets

(56) References Cited

U.S. PATENT DOCUMENTS

| | | | | |
|---|---|---|---|---|
| 2012/0201170 A1* | 8/2012 | Sofman | .................... | H04L 41/12 |
| | | | | 370/256 |
| 2012/0320916 A1* | 12/2012 | Sebastian | ........... | H04N 21/6408 |
| | | | | 370/390 |
| 2013/0014046 A1* | 1/2013 | Watts | ...................... | G01W 1/00 |
| | | | | 715/772 |
| 2014/0058908 A1* | 2/2014 | Gupta | .................... | G06Q 40/12 |
| | | | | 705/30 |
| 2015/0142955 A1* | 5/2015 | Scherzer | ............... | H04W 48/18 |
| | | | | 709/224 |
| 2015/0304020 A1* | 10/2015 | Rebec | .................... | H04H 40/90 |
| | | | | 370/316 |
| 2016/0360547 A1* | 12/2016 | Johnson | ............ | H04W 72/1257 |
| 2018/0091221 A1* | 3/2018 | Bitra | ....................... | G01S 5/163 |
| 2018/0150694 A1* | 5/2018 | Guttmann | ........... | G06K 9/00335 |
| 2018/0254996 A1* | 9/2018 | Kairali | ................ | H04L 67/1031 |
| 2019/0095436 A1* | 3/2019 | Martinazzi | .............. | G06T 11/60 |
| 2019/0200188 A1* | 6/2019 | Elgee | ...................... | H04W 4/46 |
| 2020/0082108 A1* | 3/2020 | Griffin | ................. | G06F 21/6218 |
| 2020/0136975 A1* | 4/2020 | Arora | .................... | H04L 43/045 |

\* cited by examiner

US 11,075,773 B1

DATA CAP MANAGEMENT OF SUPER HEAVY USERS BASED ON MONTHLY USAGE AND SERVICE PLAN LIMITS

BACKGROUND INFORMATION

High throughput satellite (HTS) systems are used to provide voice and data access in areas that may lack cellular or landline infrastructure. HTS systems typically employ one or more gateways (or satellite hubs) to provide service to customers by utilizing very small aperture terminals (VSATs, or simply "terminals"). Terminals and gateways are often located within a defined coverage beam of the satellite, thereby enabling communication via a bent pipe path. While current HTS systems are capable of providing stable and fast internet services over satellite link, it is challenging and essential to efficiently manage the capacity allocation by selling services with data caps suitable to each customer, ensuring high service quality for all satellite network customers.

HTS systems operate at a fixed throughput (or bandwidth) which is shared among all customers. Unlike terrestrial based internet service providers (ISPs), additional bandwidth cannot be added easily due to the cost constraints and complexities associated with building and launching additional satellites into orbit. As the number of subscribers increases, the total subscriber throughput can possibly reach or exceed the fixed maximum bandwidth of the system. It is therefore important to find effective methods to better allocate resources to more customers. From the business standpoint, it would be important to motivate the heavy users, who are also low data plan subscribers, to upgrade to higher data plans.

It is often the case that a small percentage of users (~5%) are responsible for utilizing a significant amount of bandwidth. These super heavy users can significantly affect traffic if they are utilizing high bandwidth applications during peak usage hours, thereby causing problems for other subscribers. Super heavy users also exploit the lack of robust mechanisms for identifying when contracted limits are being exceeded, and continue to utilize bandwidth in the same manner.

Based on the foregoing, there is a need for an approach for detecting super heavy throttling their data usage in order to efficiently manage bandwidth allocation to all users.

BRIEF SUMMARY

An apparatus and method are disclosed for data cap management of users exceeding or violating bandwidth policies in a communication system. According to an embodiment, the apparatus includes one or more processors configured to: create a model for identifying super heavy users in a satellite communication system; train the model with usage data for all users of the satellite communication system over a first predetermined time interval; analyze usage patterns of each user over a second predetermined time interval using the trained model; identify super heavy users based, at least in part, on the analysis; and apply traffic flow control to at least a portion of the traffic associated with each identified super heavy user based on the analysis.

According to another embodiment, the method includes: creating a model for identifying super heavy users in a satellite communication system; training the model with usage data for all users of the satellite communication system over a first predetermined time interval; analyzing usage patterns of each user over a second predetermined time interval using the trained model; identifying super heavy users based, at least in part, on the analysis; and applying traffic flow control to at least a portion of the traffic associated with each identified super heavy user based on the analysis.

The foregoing summary is only intended to provide a brief introduction to selected features that are described in greater detail below in the detailed description. As such, this summary is not intended to identify, represent, or highlight features believed to be key or essential to the claimed subject matter. Furthermore, this summary is not intended to be used as an aid in determining the scope of the claimed subject matter.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION

An apparatus and method for data cap management of users exceeding or violating bandwidth policies in a satellite communication system, are described. In the following description, for purposes of explanation, numerous specific details are set forth in order to provide a thorough understanding of the disclosed embodiments. It will become apparent, however, to one skilled in the art that various embodiments may be practiced without these specific details or with an equivalent arrangement. In other instances, well-known structures and devices are shown in block diagram form in order to avoid unnecessarily obscuring the various embodiments.

Figure 1:
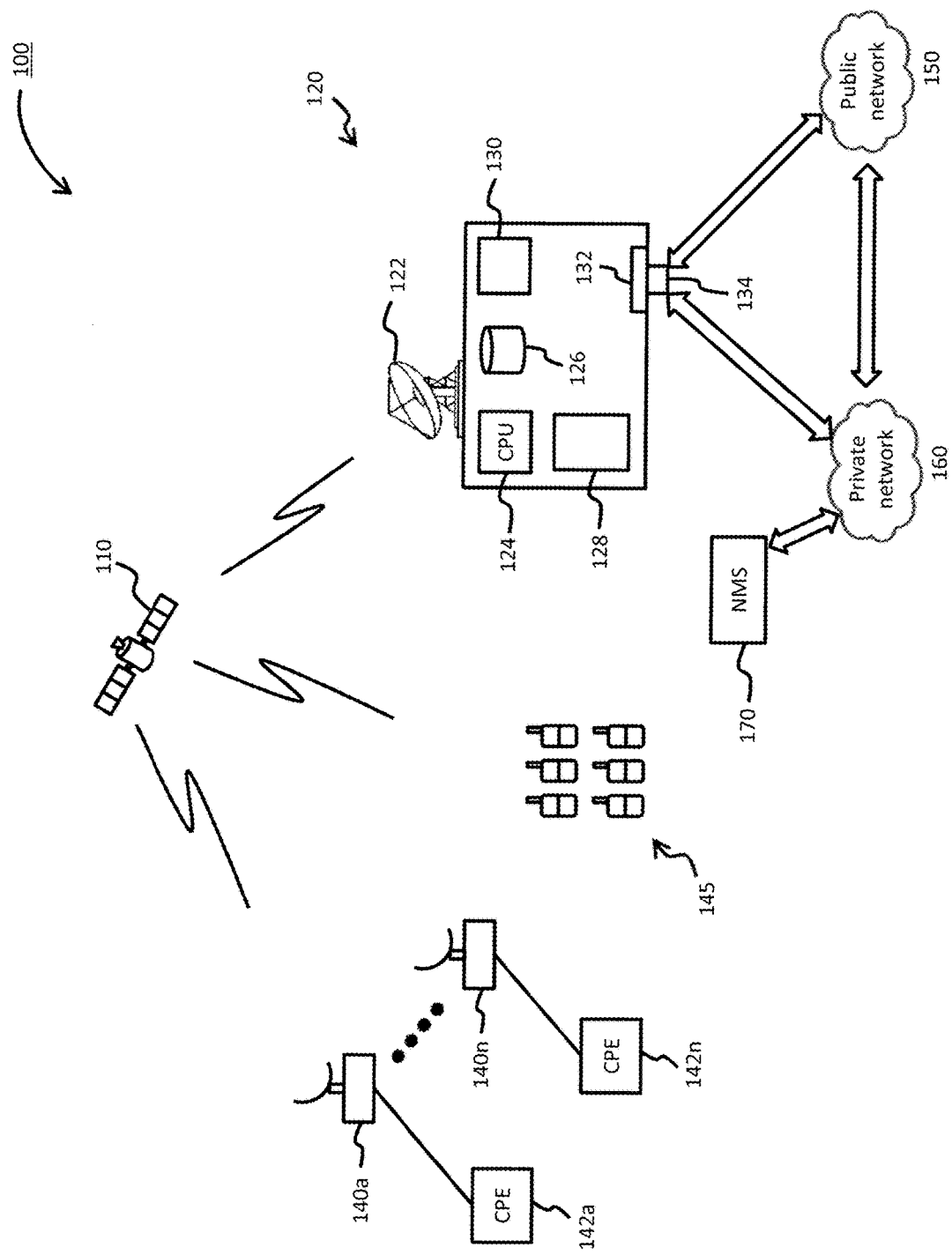
FIG. 1 is a diagram of a system capable of providing of voice and data services, according to at least one embodiment.

FIG. 1 illustrates a satellite communication system 100 capable of providing voice and data services. The satellite communication system 100 includes a satellite 110 that supports communications among a number of gateways 120 (only one shown) and multiple stationary satellite terminals 140*a*-140*n*. Each satellite terminal (or terminal) 140 can be configured for relaying traffic between its customer premise equipment (CPEs) 142*a*-142*n* (i.e., user equipment), a public network 150 such as the internet, and/or its private network 160. Depending on the specific embodiment, the customer premise equipment 142 can be a desktop computer, laptop, tablet, cell phone, etc. Customer premise equipment 142 can also be in the form of connected appliances that incorporate embedded circuitry for network communication can also be supported by the satellite terminal (or terminal) 140. Connected appliances can include, without limitation, televisions, home assistants, thermostats, refrigerators, ovens, etc. The network of such devices is commonly referred to as the internet of things (IoT).

According to an exemplary embodiment, the terminals 140 can be in the form of very small aperture terminals (VSATs) that are mounted on a structure, habitat, etc. Depending on the specific application, however, the terminal 140 can incorporate an antenna dish of different sizes (e.g., small, medium, large, etc.). The terminals 140 typically remain in the same location once mounted, unless otherwise removed from the mounting. According various embodiments, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The terms user terminal, satellite terminal, terminal may be used interchangeably herein to identify any of the foregoing types. The gateway 120 can be configured to route traffic from stationary, transportable, and mobile terminals (collectively terminals 140) across the public network 150 and private network 160 as appropriate. The gateway 120 can be further configured to route traffic from the public network 150 and private network 160 across the satellite link to the appropriate terminal 140. The terminal 140 then routes the traffic to the appropriate customer premise equipment (CPE) 142.

According to at least one embodiment, the gateway 120 can include various components, implemented in hardware, software, or a combination thereof, to facilitate communication between the terminals 140 and external networks 150, 160 via the satellite 110. According to an embodiment, the gateway 120 can include a radio frequency transceiver 122 (RFT), a processing unit 124 (or computer, CPU, etc.), and a data storage unit 126 (or storage unit). While generically illustrated, the processing 124 can encompass various configurations including, without limitations, a personal computer, laptop, server, etc. As used herein, a transceiver corresponds to any type of antenna unit used to transmit and receive signals, a transmitter, a receiver, etc. The RFT 122 is useable to transmit and receive signals within a communication system such as the satellite communication system 100 illustrated in FIG. 1. The data storage unit 126 can be used, for example, to store and provide access to information pertaining to various operations in the satellite communication system 100. Depending on the specific implementation, the data storage unit 126 (or storage unit) can be configured as a single drive, multiple drives, an array of drives configured to operate as a single drive, etc.

According to other embodiments, the gateway 120 can include multiple processing units 124 and multiple data storage units 126 in order to accommodate the needs of a particular system implementation. Although not illustrated in FIG. 1, the gateway 120 can also include one or more workstations 125 (e.g., computers, laptops, etc.) in place of, or in addition to, the one or more processing units 124. Various embodiments further provide for redundant paths for components of the gateway 120. The redundant paths can be associated with backup components capable of being seamlessly or quickly switched in the event of a failure or critical fault of the primary component.

According to the illustrated embodiment, the gateway 120 includes baseband components 128 which operate to process signals being transmitted to, and received from, the satellite 110. For example, the baseband components 128 can incorporate one or more modulator/demodulator units, system timing equipment, switching devices, etc. The modulator/demodulator units can be used to generate carriers that are transmitted into each spot beam and to process signals received from the terminals 140. The system timing equipment can be used to distribute timing information for synchronizing transmissions from the terminals 140.

According to an embodiment, a fault management unit 130 can be included in the gateway 120 to monitor activities and output one or more alerts in the event of a malfunction in any of the gateway components. The fault management unit 130 can include, for example, one or more sensors and interfaces that connect to different components of the gateway 120. The fault management unit 130 can also be configured to output alerts based on instructions received from a remotely located network management system 170 (NMS). The NMS 170 maintains, in part, information (configuration, processing, management, etc.) for the gateway 120, and all terminals 140 and beams supported by the gateway 120. The gateway 120 can further include a network interface 132, such as one or more edge routers, for establishing connections with a terrestrial connection point 134 from a service provider. Depending on the specific implementation, however, multiple terrestrial connection points 134 may be utilized.

Figure 2:
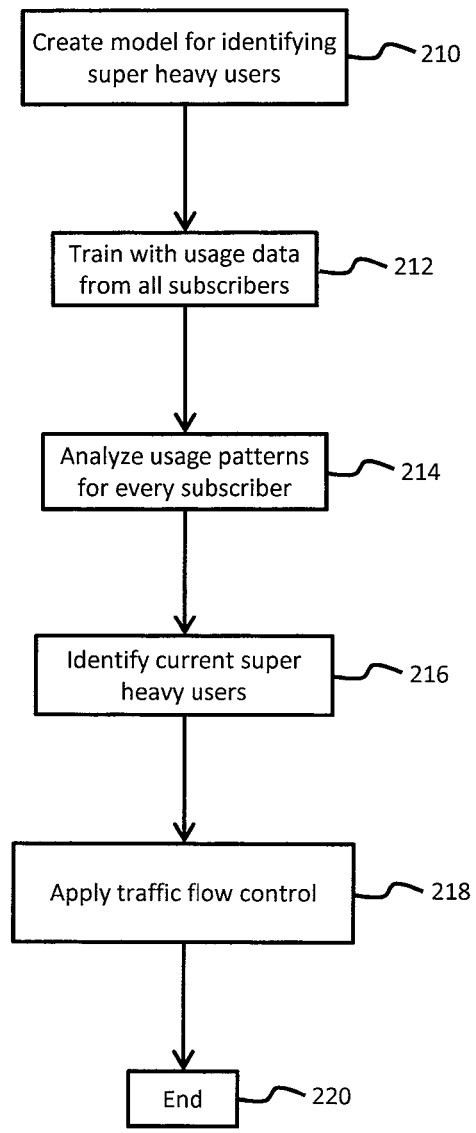
FIG. 2 is a flowchart of a process for data cap management in the system of FIG. 1, according to one embodiment.

FIG. 2 is a flowchart of a process for data cap management, in accordance with at least one embodiment. At 210, a model is created for identifying super heavy users. According to at least one embodiment, the model can be created using a supervised learning algorithm such as a Random Forest model. According to an embodiment, the model can correspond to a data cap manager (DCM). At 212, the model is trained with usage data from all subscribers in the satellite communication system. The usage data can be collected over a predetermined period of time such as, for example, 2 or 4 months. Depending on the specific implementation and system design requirements, however, a different time period can be selected. Furthermore, the time period can be dynamically adjusted based on the specific system characteristics and trends in data usage. At 214, the usage patterns of every subscriber currently active within the system are analyzed in order to determine the amount and type of data they have been using.

According to various embodiments, the usage patterns are analyzed for both past and current activity. For example, the subscriber usage patterns can be analyzed from the previous month up to the current day in order to determine if they have been flagged as super heavy users and predict whether their current usage trend will result in being identified as super heavy users. At 216, current super heavy users are identified. This can be accomplished, for example, based on the analysis of the usage patterns. According to an embodiment, every subscriber's usage pattern is analyzed. If a subscriber has been identified as a super heavy user for the last 2 months and has been subject to the system's fair access policy (FAP) in the last 5 days, then the subscriber is placed on a super heavy user list. At 218, various traffic flow control techniques are applied to restrict traffic data from the identified super heavy users and/or optimize the use of frequency resources within coverage beams (or simply "beams") containing super heavy users. The process ends at 220.

Figure 3:
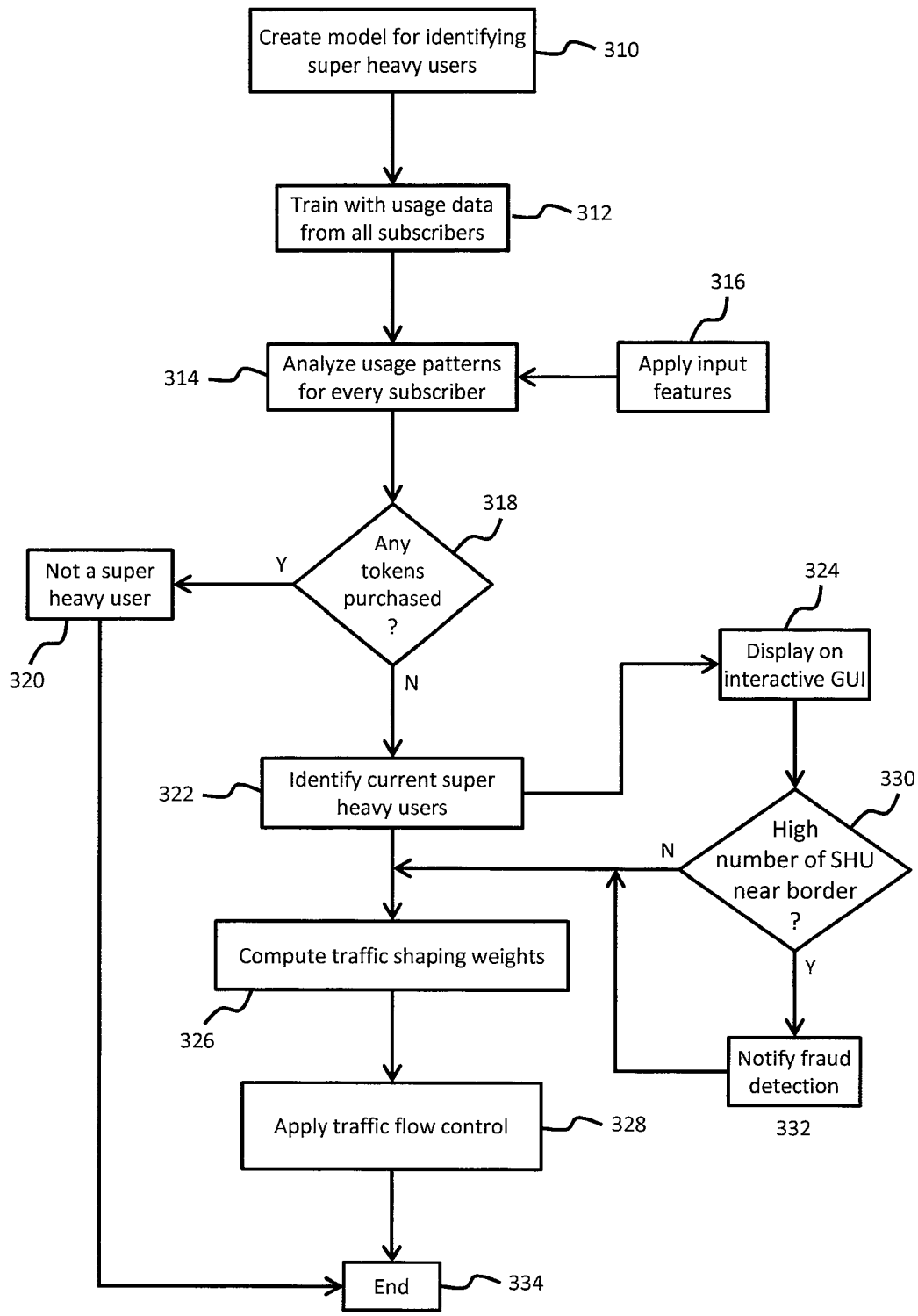
FIG. 3 is a flowchart of a process for data cap management of subscribers, according to various embodiments.

FIG. 3 is a flowchart of a process for data cap management of subscribers, in accordance with various embodiments. At 310, a model such as the data cap manager (DCM), is created for identifying super heavy users within the satellite communication system. At 312, usage data from all active subscribers in the system is used to train the model. The amount of usage data selected to train the model can vary depending on the specific system requirements. According to one specific implementation, two months of usage data is used to train the model, and a supervised learning algorithm such as, e.g., Random Forest, is applied. Random Forests (RF) are machine learning models for classification and regression by constructing a forest of decision trees. Each tree takes different features and different bunches of row indexes. Primary parameters used to tune the random forest model for maximum accuracy include the number of trees and the depth of each individual tree. At 314, usage patterns are analyzed for every subscriber active in the system. According to various embodiments, one or more input features can be applied during the analysis process. This is indicated at 316. For example, input features such as monthly download and upload bytes, total download and upload bytes during peak hours after getting throttled in anytime bucket, total download and upload bytes after getting throttled in both anytime and bonus bucket, and first day of FAP being applied in billing cycle.

At 318, it is determined whether the subscribers have purchased any tokens. For example, subscribers enroll in different plans which provide fixed amount of data allocation. If a subscriber exceeds their plan's allocated data amount, the subscriber can purchase tokens, which provides additional data that can be used until the next plan cycle. If tokens have been purchased, then control passes to 320, where the subscriber is not classified as a super heavy user. The process would then end (at step 334). If no tokens have been purchased, then the current subscriber is identified as a super heavy user at 322. According to at least one embodiment, the identified super heavy users can be displayed on an interactive interface which provides information regarding their location and/or current amount of usage data. This is indicated at 324.

At 326, traffic shaping weights are computed for applying restrictions to the accounts of identified super heavy users. At 328, the traffic shaping weights are applied to control traffic flow for the identified super heavy users. According to at least one embodiment, the traffic shaping weighs can vary depending on the usage data of the particular super heavy user. According to other embodiments, however, the same traffic shaping weights can be applied to all identified super heavy users. Traffic shaping weights for repeated super heavy users can result, for example, in a high reduction in usage data, whereas first time (or occasional) super heavy users may only result in a lower reduction in usage data. The specific reduction depends on the specific system implementation, capacity, total subscribers, etc.

According to various embodiments, the traffic flow control can include optimization of frequency capacity utilization for users within coverage beams containing super heavy users. For example, if a particular coverage beam has a high density of super heavy users, frequency resources within multiple adjacent coverage beams can be reallocated in order to improve the available bandwidth within the coverage beam containing the high density of super heavy users. Depending on the amount of resources allocated to a particular coverage beam (i.e., frequency resources), however, a high density of super heavy users may not be necessary to initiate a reallocation of resources. The precise criteria for allocating frequency resources will therefore depend on the specific system implementation, current frequency allocation in selected coverage beams, current load (resource usage) in the selected coverage beams, etc. The process would then end at 334. As can be appreciated, the system can continually monitor traffic data in the satellite communication system in order detect super heavy users exceeding their allocated bandwidth or violating certain usage agreement policies. Accordingly, the process can be repeated for all subscribers at predetermined or regular intervals. Furthermore, the process can loop continuously.

According to at least one embodiment, the interactive interface generated at 324 can include a geographical map illustrating the concentration or distribution of super heavy users. Geographical maps showing a high concentration of super heavy users near different country borders can sometimes be an indication of possible violations of the terms of agreement. For example, a customer may request installation of a terminal within an approved region (or country), and subsequently move the terminal outside of the region (or country) in violation of the terms of agreement. The terminal may subsequently be used for commercial or otherwise unapproved purposes. Accordingly, at 330 the interactive interface is examined to detect if there is a high number of super heavy users near any of the geographical borders. If a high number of super heavy users is detected, control then passes to 332 where a fraud detection unit can be notified for further investigations. If no super heavy users are detected near the border regions, then the process would continue as usual to compute traffic shaping weights (at 326) and apply traffic flow control to the super heavy users (at 328).

Figure 4:
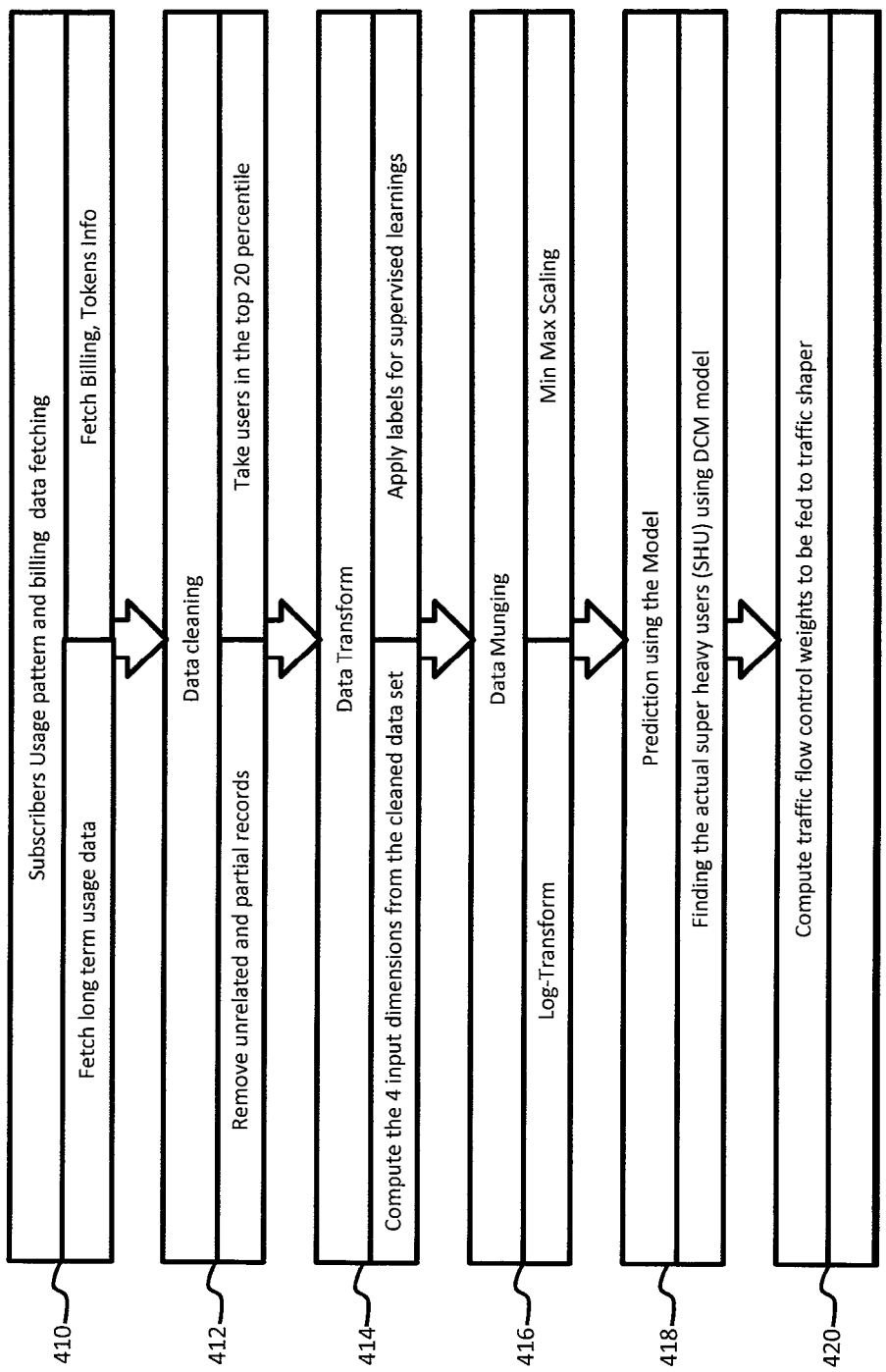
FIG. 4 is a flowchart of a process for collecting and preparing subscriber usage data for training a data cap manager, according to one or more embodiments.

FIG. 4 is a flowchart of a process for collecting and preparing subscriber usage data for training a data cap manager, in accordance with one or more embodiments. At 410, usage patterns and billing data for all subscribers is obtained. According to an embodiment, usage patterns and billing data (including token info) for all subscribers may be stored in a storage device (e.g., at the gateway, NMS, etc.) for an extended period of time. A subset of this information corresponding to a desired time period (e.g., 2 months) can therefore be retrieved at 410. Furthermore, the amount of usage pattern data retrieved may be different from the amount of billing data retrieved. The usage information retrieved can include, for example, download bytes, upload bytes, usage in different types of services (such as bulk data transfer, streaming etc.), usage pattern by days of the month, usage within the service plan's data allowances, frequency of exceeding the plan's data allowances, etc. At 412, a cleaning process is performed on the collected data. According to at least one embodiment, the cleaning process removes usage records of subscribers who are not be included in predetermined plan fit recommendations, and attempts to extrapolate information to fill partially filled records within the reasonable limits or remove them. Next, users making up for usage in >0.80 quantile of total system traffic are extracted.

At 414, a data transform phase is applied to the collected data. According to one or more embodiments, four predetermined thresholds are selected and/or determined for input features to be applied during an unsupervised learning process. For example, the input features can be as follows:

$X1>0.70$ quantile for total usage per month $X2>0.70$ quantile for total anytime usage on peak FAP per month $X3>0.70$ quantile for total usage FAP per month $X4<0.25$ quantile for first FAP day per month Any user who satisfies all four thresholds, is labeled as a super heavy user. The transform phase is completed by labeling the collected data with flags of super heavy users.

At 416, a data munging process is performed on the collected data. According to an embodiment, a Logarithmic transform is performed on the following dimensions in order to remove any skewness in the distribution:

AGG_BUCKET_ANYTIME,
TOTAL_USAGE_BYTES,
TOTAL_BYTES_ONPEAK_FAP,
TOTAL_BYTES_IN_FAP, and
CYCLE_DAY_OF_FIRSTFAP.

Next, min-max scaling of the all input feature sets is performed to normalize the entire data set. The response variable (y) is a super heavy usage flag, which is primarily unknown. The dataset dimensions (X) include four variables shown below:

1) Total Usage: The monthly download and upload bytes.
2) Total Usage during normal operational hours while the service contract's soft limits are exceeded: The total download and upload bytes during peak hours after getting throttled in anytime bucket.
3) Total Usage for 24 hours while the service contract's soft limits are exceeded: The total download and upload bytes after get throttled in both anytime and bonus bucket.
4) First service contract's soft limits are exceeded day: The first day the customer is subject to FAP in the billing cycle.

At 418, the DCM model is applied for training and prediction. According to one or more embodiments, after the model has been trained and saved with the selected data set, an additional dataset (e.g., 2 months) is used to predict the model and target super heavy users for both months based on the pre-trained model. Finally, in production, the FAP usage status of the customer is validated. Customers are reported as super heavy user, when they are continuously on FAP for last 5 days. At 420, the traffic flow control weights (i.e., traffic shaping weights) are determined. According to an embodiment, recent usage and billing information is examined to determine whether the identified subscriber's usage remains well above the data cap, and the subscriber has not purchased any tokens. If these conditions are satisfied, then compute the traffic shaping weights to be applied for various data usage category are computed and those thresholds are input to the traffic shaper.

Figure 5:
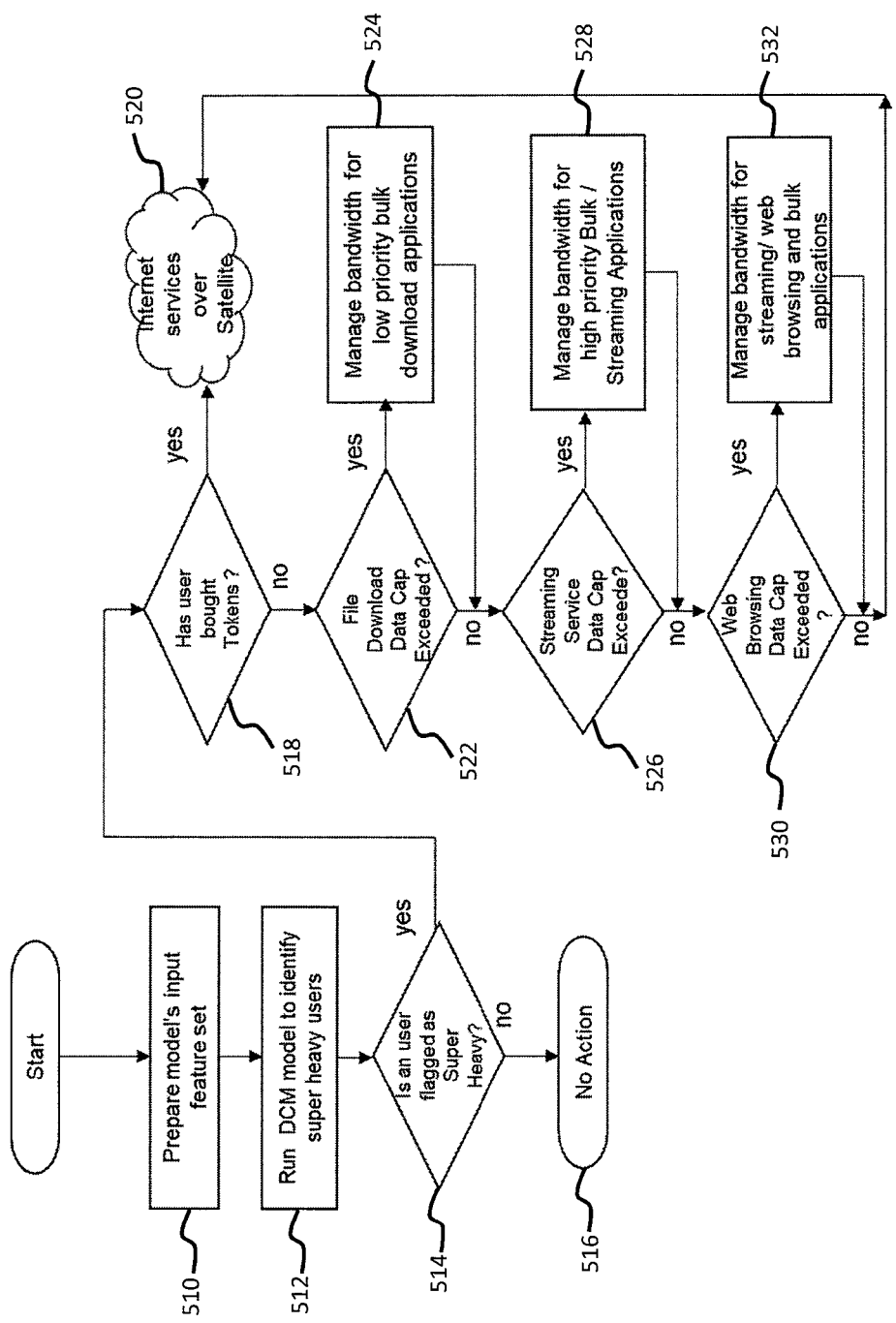
FIG. 5 is a flowchart of a process for implementing traffic control for subscribers currently subject to data cap management, according to various embodiments.

FIG. 5 is a flowchart of a process for applying traffic control mechanisms to subscribers currently subject to data cap management, in accordance with various embodiment. At 510, the input feature set for the model is prepared. At 512, the DCM model is used to analyze user traffic in order to identify super heavy users. Different criteria can be applied to identify super heavy users, depending on the specific system implementation. For example, super heavy users can be identified based on data usage history, FAP application, etc. As previously discussed, if the user has purchased tokens to supplement their available data, they will not be labeled as super heavy users. At 514, it is determined whether the current user has been flagged as a super heavy user. If the user has not been flagged as a super heavy user, then control passes to 516 and no further action is taken against that particular user. If the user has been flagged as a super heavy user, however, control passes to 518 where it is determined if the selected user has purchased any tokens. If tokens have been purchased, control passes the 520 where data services such as internet access are facilitated over the satellite network.

If the user has not purchased any tokens, however then at 522, it is determined whether a file download data cap been exceeded. If the user has exceeded their file download data cap, then control passes to 524, where the user's bandwidth can be managed for low priority bulk download applications. According to at least one embodiment, this can be accomplished by applying one or more traffic shaping weights. Control then passes to 526. If the user has not exceeded their file download data cap, control also passes the 526. Next, it is determined whether or not the user has exceeded their streaming service data cap. If the streaming service data cap has been exceeded, then control passes to 528. Bandwidth for high priority bulk and streaming applications is managed using, for example, traffic shaping weights. Control then passes the 530. Likewise, if the user has not exceeded their streaming service data, then control also passes to 530 where it is determined whether or not the user has exceeded their web browsing data cap.

If the web browsing data cap has been exceeded, then bandwidth for streaming, web browsing, and bulk applications is managed using, for example, the traffic shaping weights. The user is subsequently allowed to access internet services with the traffic shaping restrictions currently being applied. More particularly, if the user had exceeded any of the previous data cap limits, then specific traffic shaping weights may have been applied to limit (or reduce) available bandwidth for the particular category that had been exceeded. No limits would apply to categories that were not exceeded. If the user's web browsing data cap has not been exceeded, then control passes to 520 where internet services can be accessed. According to the illustrated embodiment, if the selected user has not exceeded any of their data caps, then internet services would be accessed in a normal manner. If any of the data caps have been exceeded, then at least some of the services corresponding to the exceeded data caps would be restricted based on the traffic shaping policy.

Figure 6:
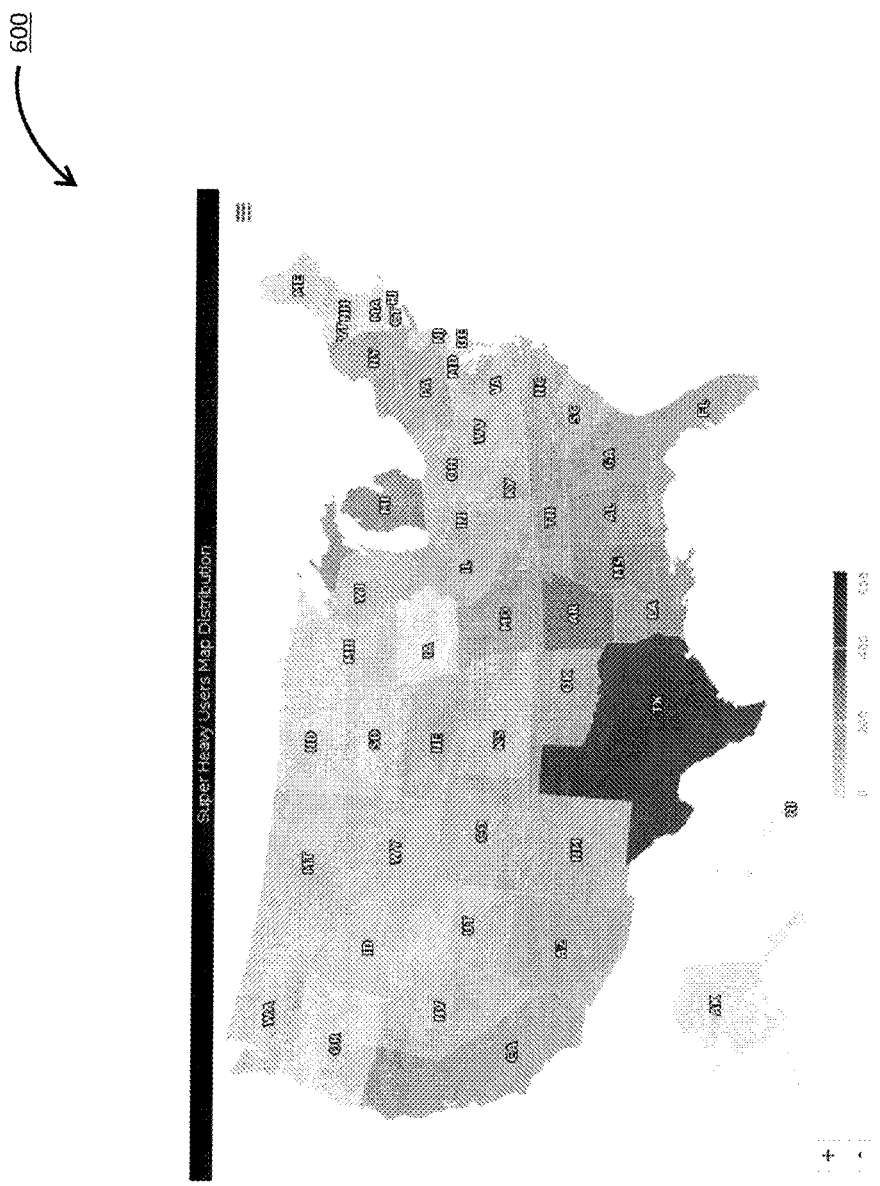
FIG. 6 is a diagram illustrating geographical distribution of super heavy user, according to at least one embodiment.

FIG. 6 is a map 600 illustrating a distribution of super heavy users on geographical map of the United States. As previously discussed, various embodiment include an ability to generate an interactive GUI capable of displaying various information. According to at least one embodiment, the map can be color coded and/or include absolute counts of the actual super heavy users in the state of Texas. Furthermore, the map can be enlarged to display county level distribution. The geographic visualization of super heavy users provided by the map 600 may advantageously assist in detection of non-conforming/fraudulent activities along the borders. For example, a terminal installed in Texas may be moved across the border, where an existing residential service plan may be used to provide community Wi-Fi services.

Figure 7:
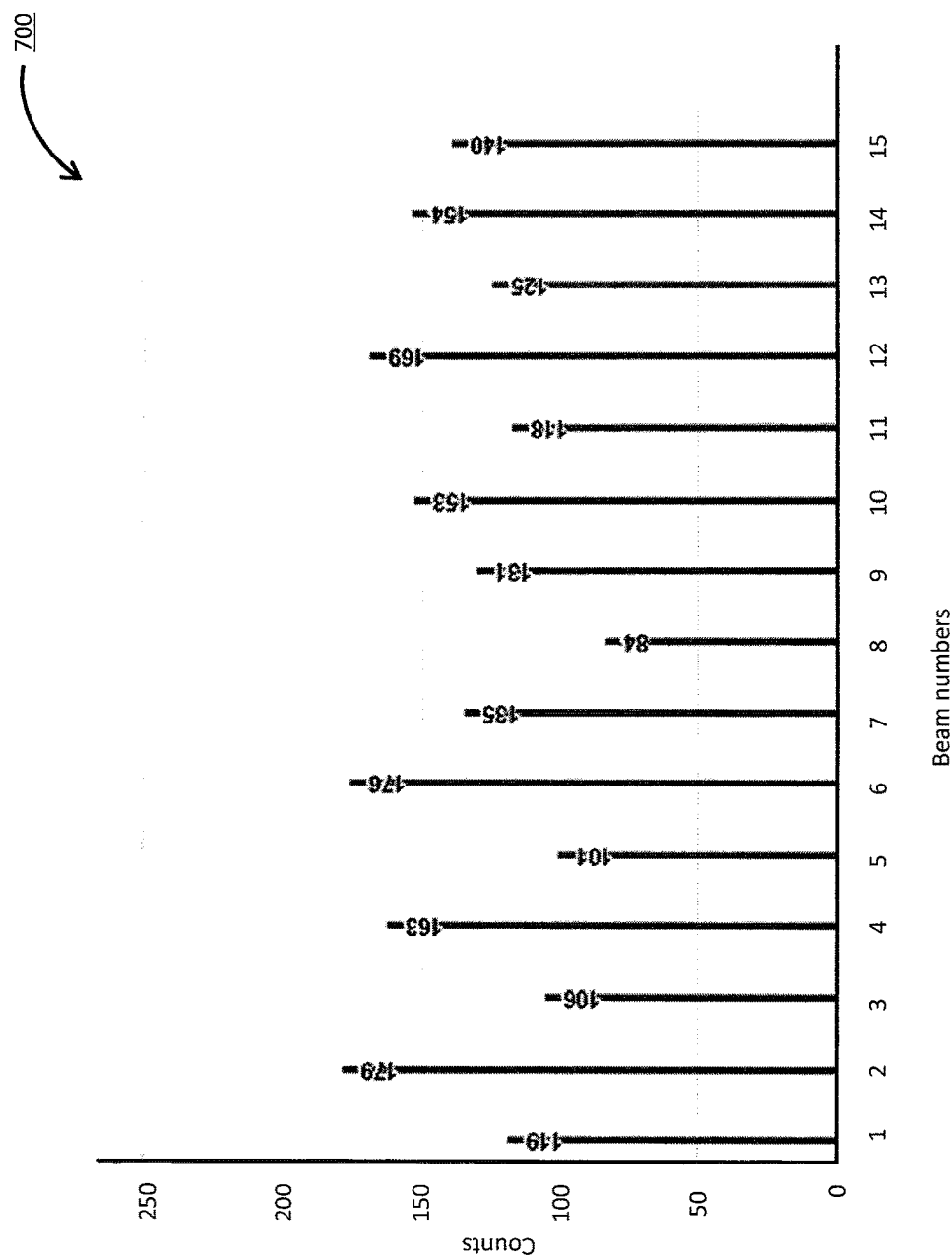
FIG. 7 is a graph illustrating the number of identified super heavy users in exemplary coverage beams, according to one embodiment.

FIG. 7 is a graph 700 illustrating counts of super heavy users in exemplary coverage beams. For example, beam_1 contains 119 super heavy users, beam_2 contains 179 super heavy users, beam_3 contains 106 super heavy users, etc. According to the illustrated embodiment, the graph 700 provides information for fifteen (15) coverage beams. The graph 700 can be displayed using an interactive GUI which allows an operator to select the specific coverage beams as well as the number of coverage beams that should be displayed. Accordingly, some or all coverage beams may be selected for display.

Various features described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Furthermore, various features can be implemented using algorithms illustrated in the form of flowcharts and accompanying descriptions. Some or all steps associated with such flowcharts can be performed in a sequence independent manner, unless otherwise indicated. Those skilled in the art will also understand that features described in connection with one Figure can be combined with features described in connection with another Figure. Such descriptions are only omitted for purposes of avoiding repetitive description of every possible combination of features that can result from the disclosure.

The terms software, computer software, computer program, program code, and application program may be used interchangeably and are generally intended to include any sequence of machine or human recognizable instructions intended to program/configure a computer, processor, server, etc. to perform one or more functions. Such software can be rendered in any appropriate programming language or environment including, without limitation: C, C++, C#, Python, R, Fortran, COBOL, assembly language, markup languages (e.g., HTML, SGML, XML, VoXML), Java, JavaScript, etc. As used herein, the terms processor, microprocessor, digital processor, and CPU are meant generally to include all types of processing devices including, without limitation, single/multi-core microprocessors, digital signal processors (DSPs), reduced instruction set computers (RISC), general-purpose (CISC) processors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components. Such exemplary hardware for implementing the described features are detailed below.

Figure 8:
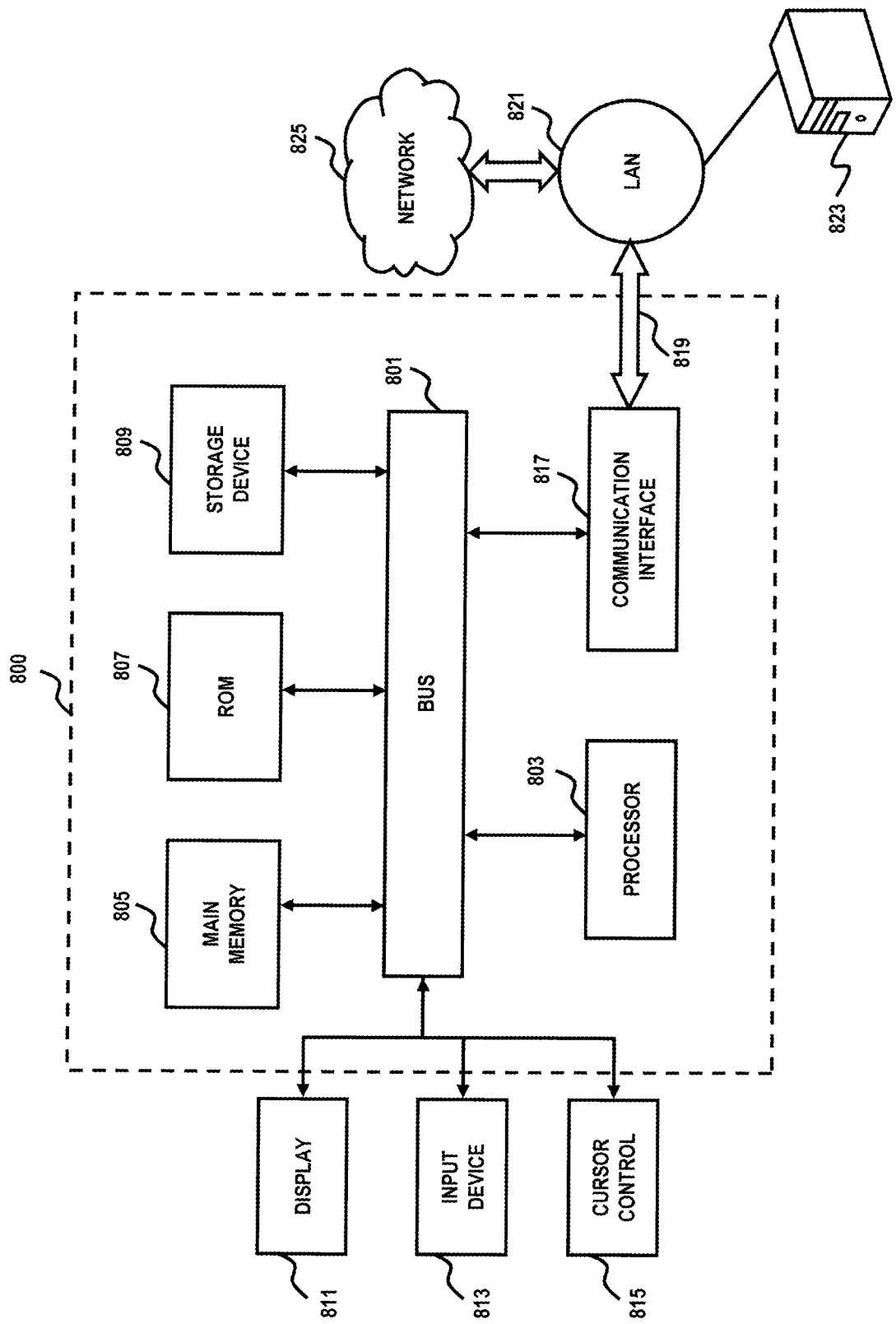
FIG. 8 is a diagram of a computer system that can be used to implement various exemplary features and embodiments.

FIG. 8 is a diagram of a computer system that can be used to implement features of various embodiments. The computer system 800 includes a bus 801 or other communication mechanism for communicating information and a processor 803 coupled to the bus 801 for processing information. The computer system 800 also includes main memory 805, such as a random access memory (RAM), dynamic random access memory (DRAM), synchronous dynamic random access memory (SDRAM), double data rate synchronous dynamic random-access memory (DDR SDRAM), DDR2 SDRAM, DDR3 SDRAM, DDR4 SDRAM, etc., or other dynamic storage device (e.g., flash RAM), coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a light emitting diode (LED) or other flat panel displays, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811. Additionally, the display 811 can be touch enabled (i.e., capacitive or resistive) in order facilitate user input via touch or gestures.

According to an exemplary embodiment, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement exemplary embodiments. Thus, exemplary embodiments are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, fiber optic service (FiOS) line, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a High Definition Multimedia Interface (HDMI), etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 such as a wide area network (WAN) or the Internet. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an exemplary embodiment through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Non-volatile media can further include flash drives, USB drives, microSD cards, etc. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a USB drive, microSD card, hard disk drive, solid state drive, optical disk (e.g., DVD, DVD RW, Blu-ray), or any other medium from which a computer can read.

Figure 9:
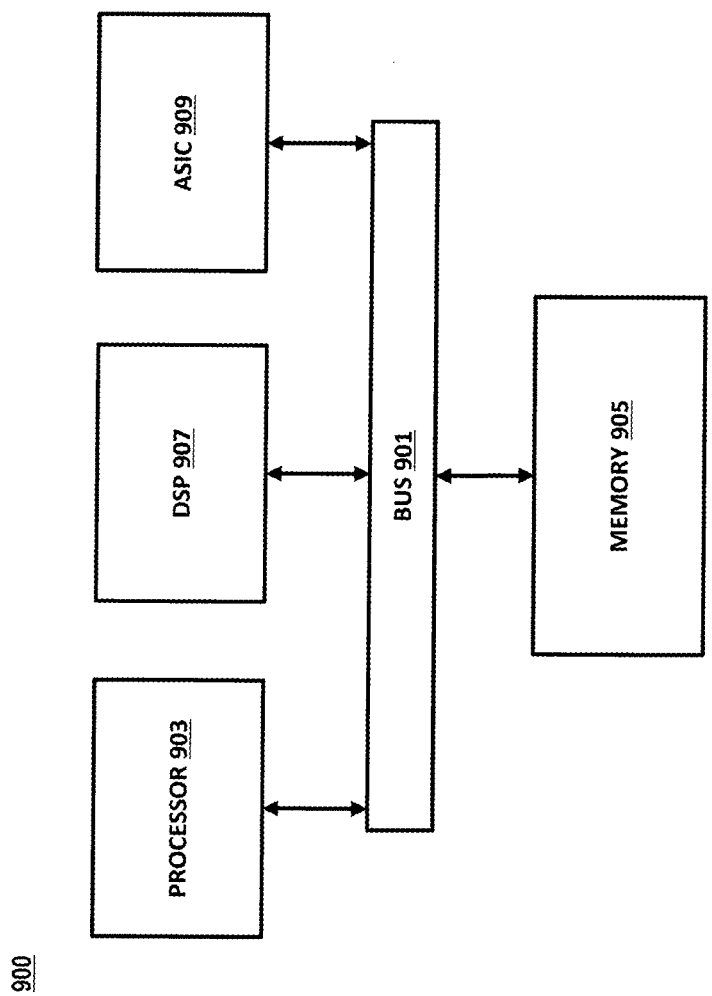
FIG. 9 is a diagram of a chip set that can be used to implement various exemplary features and embodiments.

FIG. 9 illustrates a chip set 900 upon which features of various embodiments may be implemented. Chip set 900 is programmed to implement various features as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of the figures.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, re-writable optical disk, etc.) and static memory (e.g., ROM, CD-ROM, DVD, BLU-RAY disk, etc.) for storing executable instructions that when executed perform the inventive steps described herein. The memory 905 also stores the data associated with or generated by the execution of the inventive steps.

While certain exemplary embodiments and implementations have been described herein, other embodiments and modifications will be apparent from this description. Accordingly, the various embodiments described are not intended to be limiting, but rather are encompassed by the broader scope of the presented claims and various obvious modifications and equivalent arrangements.

What is claimed is:

1. A method comprising:
creating a model for identifying super heavy users in a satellite communication system;
training the model with usage data for all users of the satellite communication system over a first predetermined time interval;
analyzing usage patterns of each user over a second predetermined time interval using the trained model;
identifying super heavy users based, at least in part, on the analysis; and
applying traffic flow control to at least a portion of the traffic associated with each identified super heavy user based on the analysis.

2. The method of claim 1, wherein the usage patterns are analyzed based, at least in part, on one or more of the following input features for the model: monthly download and upload bytes, total download and upload bytes during peak hours after getting throttled in anytime bucket, total download and upload bytes after getting throttled in both anytime and bonus bucket, and first day of Fair Access policy (FAP) being applied in billing cycle.

3. The method of claim 1, wherein identifying super heavy users further comprises:
selecting users who have met super heavy user criteria for the second predetermined time interval; and
determining if the selected users have been on FAP for a 5 day period.

4. The method of claim 3, further comprising determining if the selected users have purchased usage tokens after exceeding a preset data cap.

5. The method of claim 1, wherein applying traffic flow control further comprises computing traffic shaping weights for one or more data usage categories.

6. The method of claim 5, wherein the data usage categories include at least: low priority bulk download applications, high priority bulk download applications, streaming web browsing and bulk applications.

7. The method of claim 1, further comprising generating a graphical user interface (GUI) for providing a visual representation of super heavy user distribution within the satellite communication system.

8. The method of claim 7, wherein the visual representation includes a geographical map corresponding to a coverage area for the satellite communication system.

9. The method of claim 8, wherein the coverage map includes coverage beams for the satellite communication system and a count of super heavy users within each coverage beam.

10. The method of claim 7, further comprising analyzing super heavy user activity along borders to assess potentially fraudulent activities.

11. An apparatus comprising:
one or more processors configured to:
create a model for identifying super heavy users in a satellite communication system;
train the model with usage data for all users of the satellite communication system over a first predetermined time interval;
analyze usage patterns of each user over a second predetermined time interval using the trained model;
identify super heavy users based, at least in part, on the analysis; and
apply traffic flow control to at least a portion of the traffic associated with each identified super heavy user based on the analysis.

12. The apparatus of claim 11, wherein the one or more processors are configured to analyze the usage patterns based, at least in part, on one or more of the following input features for the model: monthly download and upload bytes, total download and upload bytes during peak hours after getting throttled in anytime bucket, total download and upload bytes after getting throttled in both anytime and bonus bucket, and first day of Fair Access policy (FAP) being applied in billing cycle.

13. The apparatus of claim 11, wherein the one or more processors are further configured to identify super heavy users by:
selecting users who have met super heavy user criteria for the second predetermined time interval; and
determining if the selected users have been on FAP for a 5 day period.

14. The apparatus of claim 13, wherein the one or more processors are configured to determine if the selected users have purchased usage tokens after exceeding a preset data cap.

15. The apparatus of claim 11, wherein the one or more processors are configured to apply traffic flow control by computing traffic shaping weights for one or more data usage categories.

16. The apparatus of claim 15, wherein the data usage categories include at least: low priority bulk download applications, high priority bulk download applications, streaming web browsing and bulk applications.

17. The apparatus of claim 11, wherein the one or more processors are configured to generate a graphical user interface (GUI) for providing a visual representation of super heavy user distribution within the satellite communication system.

18. The apparatus of claim 17, wherein the visual representation includes a geographical map corresponding to a coverage area for the satellite communication system.

19. The apparatus of claim 18, wherein the coverage map includes coverage beams for the satellite communication system and a count of super heavy users within each coverage beam.

20. The apparatus of claim 17, wherein the one or more processors are configured to analyze super heavy user activity along borders to assess potentially fraudulent activities.

* * * * *